(12) United States Patent
Krupadanam et al.

(10) Patent No.: US 8,972,085 B2
(45) Date of Patent: Mar. 3, 2015

(54) MODE SELECTION CONTROL SYSTEM FOR AN ELECTRICALLY VARIABLE TRANSMISSION

(75) Inventors: Ashish Krupadanam, Cupertino, CA (US); Nadirsh Patel, Farmington Hills, MI (US); Goro Tamai, West Bloomfield, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 24 days.

(21) Appl. No.: 13/532,199

(22) Filed: Jun. 25, 2012

(65) Prior Publication Data

US 2013/0030627 A1    Jan. 31, 2013

Related U.S. Application Data

(60) Provisional application No. 61/513,080, filed on Jul. 29, 2011.

(51) Int. Cl.
| | |
|---|---|
| *B60W 20/00* | (2006.01) |
| *B60W 10/06* | (2006.01) |
| *B60W 10/08* | (2006.01) |
| *B60W 10/10* | (2012.01) |

(52) U.S. Cl.
CPC ............ *B60W 10/06* (2013.01); *B60W 10/08* (2013.01); *B60W 20/00* (2013.01); *B60W 2510/244* (2013.01); *B60W 2520/10* (2013.01); *B60W 2540/10* (2013.01); *B60W 2710/105* (2013.01); *B60W 20/102* (2013.01); *Y02T 10/56* (2013.01); *Y02T 10/6286* (2013.01); *Y10S 903/93* (2013.01); *Y10S 903/945* (2013.01)
USPC ............................. 701/22; 903/930; 903/945

(58) Field of Classification Search
USPC ............... 710/22, 51, 54; 475/5; 477/71, 171; 701/22, 51, 54
See application file for complete search history.

(56) References Cited

U.S. PATENT DOCUMENTS

| | | | | |
|---|---|---|---|---|
| 7,344,478 | B2 * | 3/2008 | Reith | 477/171 |
| 2004/0014559 | A1 * | 1/2004 | Bulgrien | 477/71 |
| 2005/0246076 | A1 * | 11/2005 | Chen et al. | 701/22 |
| 2007/0078580 | A1 * | 4/2007 | Cawthorne et al. | 701/51 |
| 2008/0120002 | A1 * | 5/2008 | Heap | 701/54 |
| 2009/0209381 | A1 * | 8/2009 | Ai et al. | 475/5 |
| 2011/0111909 | A1 * | 5/2011 | Kim et al. | 475/5 |
| 2011/0130234 | A1 * | 6/2011 | Phillips | 475/5 |
| 2013/0030627 | A1 * | 1/2013 | Krupadanam et al. | 701/22 |

\* cited by examiner

*Primary Examiner* — Tuan C. To
*Assistant Examiner* — Yuri Kan
(74) *Attorney, Agent, or Firm* — Ralph E Smith

(57) ABSTRACT

A mode selection control system and method for controlling an electrically variable transmission. The system and method calculate respective costs for operating the vehicle in a plurality of operating modes based on a battery discharge penalty and the costs associated with operating the electrical and mechanical portions of the transmission. The method selects an operating mode having the lowest calculated cost.

14 Claims, 5 Drawing Sheets

| POINT(S) | DESCRIPTION |
|---|---|
| A | VEHICLE STARTS IN IB-EV MODE. MOTORS A AND B PROPEL THE VEHICLE |
| A TO B | VEHICLE OPERATES IN IB-EV MODE. MOTORS A AND B PROPEL THE VEHICLE |
| B | IB-EV TO OD-EV SHIFT. MOTOR B PROPELS THE VEHICLE |
| B TO C | OD-EV MODE. MOTOR B PROPELS THE VEHICLE. MOTOR A ACCELERATES THE ENGINE |
| C | ENGINE STARTS. OD-EV TO OD-EO TRANSITION |
| C TO D | OD-EO MODE. ENGINE AND MOTORS PROPEL THE VEHICLE |
| D | OD-EO TO UD-EO SHIFT |
| D TO E | UD-EO MODE. ENGINE AND MOTORS PROPEL THE VEHICLE. HIGHER RATIO FROM ENGINE TO OUTPUT |
| E | UD-EO TO OD-EO SHIFT |
| E TO F | OD-EO MODE. ENGINE AND MOTORS PROPEL THE VEHICLE. LOWER RATIO FROM ENGINE TO OUTPUT |
| F | ENGINE SHUT-OFF. OD-EO TO OD-EV TRANSITION. MOTOR B PROPELS THE VEHICLE OR PROVIDES REGENERATIVE BRAKING AS NEEDED |
| F TO G | OD-EV MODE. MOTOR B PROPELS THE VEHICLE OR PROVIDES REGENERATIVE BRAKING AS NEEDED. MOTOR A SPINS ENGINE DOWN TO ZERO SPEED |
| G | OD-EV TO IB-EV SHIFT. BOTH MOTORS A AND B PROVIDE REGENERATIVE BRAKING (OR PROPULSION) AS NEEDED |
| G TO H | IB-EV MODE. BOTH MOTORS A AND B PROVIDE REGENERATIVE BRAKING (OR PROPULSION) AS NEEDED |
| H | VEHICLE STOPS IN IB-EV MODE |

FIG. 3

MODE SELECTION CONTROL SYSTEM FOR AN ELECTRICALLY VARIABLE TRANSMISSION

CROSS-REFERENCE TO RELATED APPLICATION

This application claims the benefit of U.S. Provisional Application No. 61/513,080, filed Jul. 29, 2011.

FIELD

The present disclosure relates to the control of an automotive transmission, specifically to a mode selection control system and method for controlling an electrically variable transmission.

BACKGROUND

Some current hybrid electrically variable transmissions feature two electric motors coupled to an internal combustion engine utilizing a plurality of clutches and gear sets. At certain times it is desirable to operate the transmissions in strictly an electric mode or in a hybrid mode where the internal combustion engine and one or both motors operate simultaneously. Managing the many parameters such as clutch, engine and motor torques, battery power levels and usage, efficiency and smooth shifting between the various gears and drive modes, fuel economy, operational-cost efficiency, etc. pose many operational control challenges.

Thus, there remains a need for continuous improvement in the operational control of hybrid electrically variable transmissions.

SUMMARY

In one form, the present disclosure provides a method of selecting a mode of operation of a vehicle having an electrically variable transmission. The method comprises using a processor to perform the steps of: determining a battery discharge penalty; determining a cost associated with operating an electrical portion of the transmission; determining a cost associated with operating a mechanical portion of the transmission; calculating respective costs for operating the vehicle in a plurality of operating modes based on the battery discharge penalty and the costs associated with operating the electrical and mechanical portions of the transmission; and selecting an operating mode having the lowest calculated cost.

The present disclosure also provides a controller for selecting a mode of operation of a vehicle having an electrically variable transmission. The controller comprises a processor programmed to: determine a battery discharge penalty; determine a cost associated with operating an electrical portion of the transmission; determine a cost associated with operating a mechanical portion of the transmission; calculate respective costs for operating the vehicle in a plurality of operating modes based on the battery discharge penalty and the costs associated with operating the electrical and mechanical portions of the transmission; and select an operating mode having the lowest calculated cost.

Further areas of applicability of the present disclosure will become apparent from the detailed description, drawings and claims provided hereinafter. It should be understood that the detailed description, including disclosed embodiments and drawings, are merely exemplary in nature intended for purposes of illustration only and are not intended to limit the scope of the invention, its application or use. Thus, variations that do not depart from the gist of the invention are intended to be within the scope of the invention.

BRIEF DESCRIPTION OF THE DRAWINGS

FIG. 3 is a table describing the various drive cycle points illustrated in FIG. 2;

DETAILED DESCRIPTION

Figure 1:
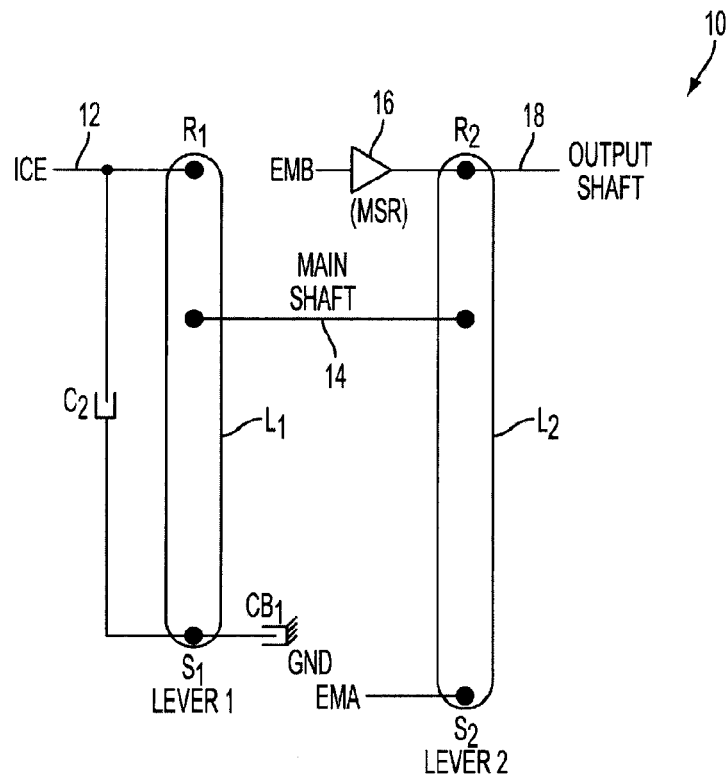
FIG. 1 is an illustration of a lever diagram of a drive system for a vehicle with an electrically variable transmission.

U.S. application Ser. No. 12/882,936, (the "'936 Application) filed Sep. 15, 2010 and titled "Multi-Speed Drive Unit," discloses various compound-input electrically variable transmissions ("EVT"), the disclosure incorporated herein by reference. U.S. application Ser. No. 13/188,799; filed Jul. 22, 2011 and titled "Clutch System for a Transmission", the disclosure incorporated herein by reference, discloses a clutch system that can be used e.g., in the '936 Application's multi-speed drive unit to create a two dry "clutch" drive system, similar to a DDCT (dual dry clutch transmission), for the drive unit. FIG. 1 is an example lever diagram of such a drive system 10.

A seen in FIG. 1, the drive system 10 includes a first planetary gear set represented by a first lever $L_1$ and a second planetary gear set represented by a second lever $L_2$. A ring gear $R_1$ of the first planetary gear set is connected to an internal combustion engine ICE via an input shaft 12. A sun gear $S_1$ of the first planetary gear set is connected to two clutches $CB_1$, $C_2$. In the illustrated example, the first clutch $CB_1$ is a braking mechanism that, when activated, grounds the sun gear $S_1$ to the drive unit's transaxle case. When activated, the second clutch $C_2$ connects the sun gear $S_1$ to the engine. An input brake is created when both clutches $CB_1$, $C_2$ are activated at the same time.

The carriers of the planetary gear sets are connected via a main shaft 14. A sun gear $S_2$ of the second planetary gear set is connected to a first electric motor EMA. A ring gear $R_2$ of the second planetary gear set is connected to a second electric motor EMB via a motor speed reducer ("MSR") 16. The ring gear $R_2$ of the second planetary gear set is also connected to an output shaft 18. The motor speed reducer 16 controls the speed ratio between the second electric motor EMB and the output shaft 18.

The '936 Application discloses three input ratios. A first ratio is created by activating the first clutch $CB_1$ while deactivating the second clutch $C_2$. A second ratio is created by deactivating the first clutch $CB_1$ while activating the second clutch $C_2$. The third ratio is the input brake created by activating the first and second clutches $CB_1$, $C_2$. There is a need to control the drive system 10 to efficiently switch between drive modes and gear ratios to optimize the system's and vehicle's performance and to improve fuel economy.

Figure 2:
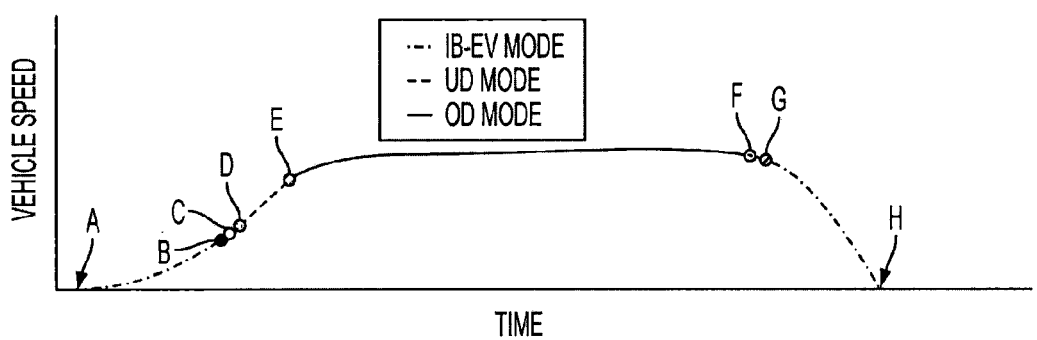
FIG. 2 is an illustration of an example drive cycle for a vehicle in accordance with the present disclosure.

FIG. 2 is an illustration of an example drive cycle for a vehicle containing a FIG. 1 drive system 10 and being controlled in accordance with the present disclosure. In the example, the vehicle accelerates from a stop, cruises at high speed and brakes to a stop. The various points and switching points of the drive cycle are listed in the table shown in FIG. 3.

During the cycle, the system 10 enters different modes to deliver the required output power from the electric motors and/or engine to the output shaft. The modes are chosen for best fuel economy and drive quality. The system 10 will operate in the following modes: input brake electric vehicle ("IB-EV"), under drive electric vehicle ("UD-EV"), over drive electric vehicle ("OD-EV"), under drive engine on ("UD-EO"), over drive engine on ("OD-EO"), and neutral (N). As shown in the table of FIG. 3, there are points and modes when the electric motors are propelling the vehicle without assistance from the engine (e.g., point A), propelling the vehicle with the assistance from the engine (e.g., points D to E) or providing regenerative braking (e.g., point G).

Both clutches $CB_1$ and $C_2$ will be applied (i.e., engaged or activated) to implement the IB-EV mode. The first clutch $CB_1$ will be applied while the second clutch $C_2$ is not applied (i.e., disengaged or deactivated) to implement the UD-EV and UD-EO modes. The first clutch $CB_1$ will not be applied while the second clutch $C_2$ is applied to implement the OD-EV and OD-EO modes. Both clutches $CB_1$ and $C_2$ will be disengaged in the neutral mode. It should be appreciated that this disclosure refers to the first clutch $CB_1$ as a braking clutch, but the disclosure is not limited to a braking clutch; as shown in the '936 application, many clutches or synchronizers could be used in the system 10.

The aspects of the present disclosure are designed to select the optimum mode of operation (i.e., IB-EV, UD-EV, OD-EV, UD-EO, OD-EO, and N) for the system. The control method described herein is implemented on a controller or programmed processor in the drive system. In one preferred implementation, the aspects described herein will be implemented as part of a supervisory hybrid electric vehicle controller 802 (FIG. 8) such as the one described in U.S. application No. 61/513,061; filed Jul. 29, 2011 and titled "Engine Start Control System for an Electrically Variable Transmission", the disclosure incorporated herein by reference. The aspects described herein will analyze the modes of operation and determine, from an over-all system point of view, which mode would be the most efficient to operate the transaxle in at any given point in time.

Figure 4:
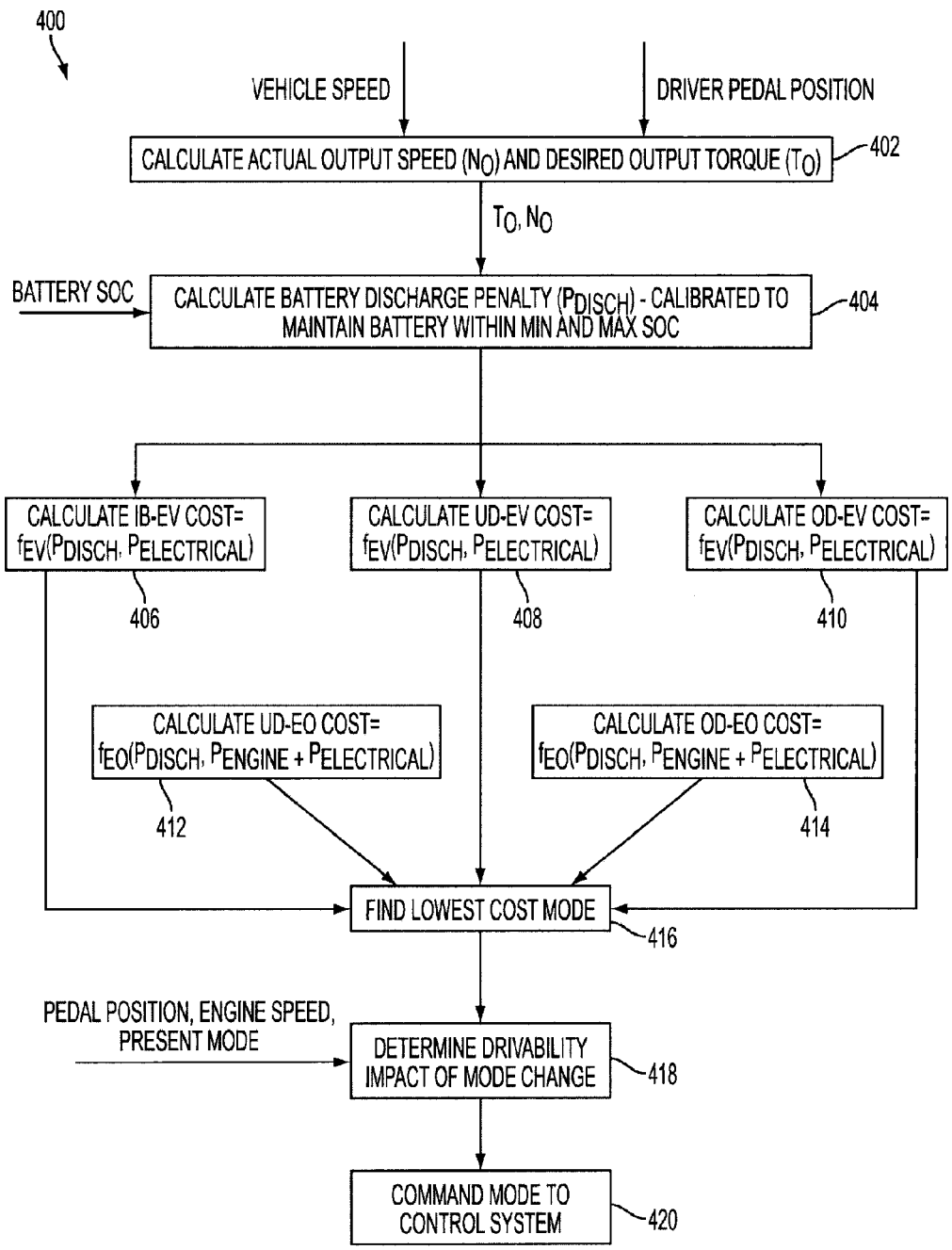
FIG. 4 is a flowchart of a mode selection control process in accordance with the present disclosure.

FIG. 4 is a flowchart of a mode selection control process 400 in accordance with the present disclosure. At step 402, the process 400 uses the vehicle's speed and driver pedal position (i.e., position of the vehicle's throttle) to calculate the actual output speed $N_o$ and a desired output torque $T_o$. The calculated actual output speed $N_o$ and desired output torque $T_o$ are used, along with an input battery state of charge ("SOC"), at step 404 to calculate a battery discharge penalty $P_{Disch}$. The process at step 404 also ensures that the calculated battery discharge penalty $P_{Disch}$ is calibrated to maintain the battery within a minimum and maximum state of charge range.

Figure 5:
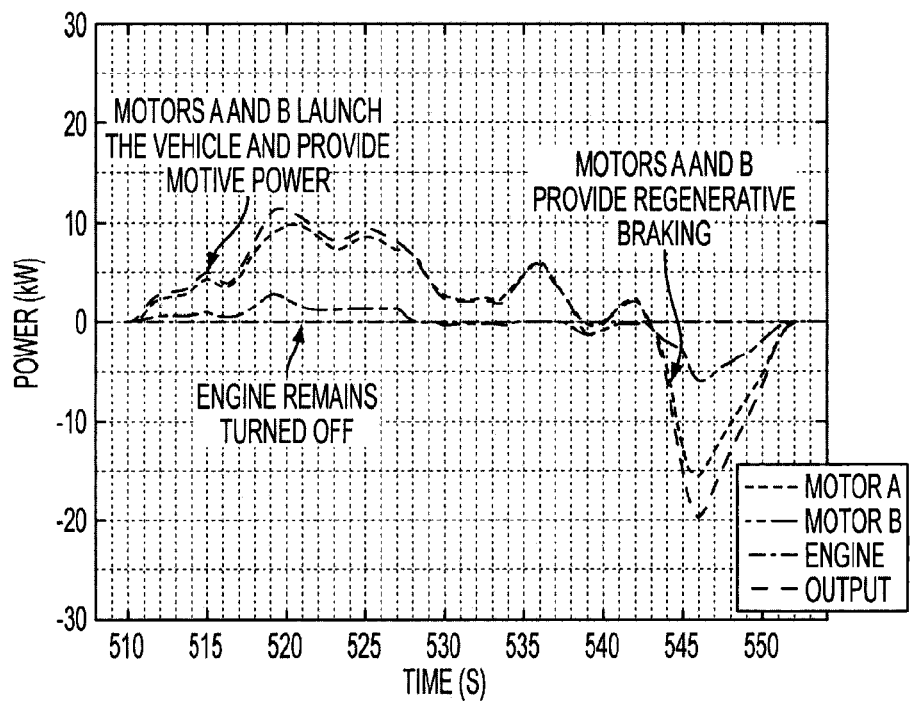
FIG. 5 is a graph of power versus time for electric vehicle operation in accordance with the present disclosure.

Step 406 calculates the "cost" for operating the system in the IB-EV mode, which is shown as a function $f_{EV}(P_{Disch}, P_{Electrical})$. It should be noted that the term "cost" is used herein to refer to the amount of mechanical and electrical resources needed to implement the mode. $P_{Electrical}$ is the penalty/cost for operating the electric motors. As mentioned above, in the IB-EV mode, the engine is held stationary by engaging both clutches $CB_1$, $C_2$. In this mode, the vehicle is propelled only by the two electric motors EMA, EMB. Thus, the output torque is the combination of the torques from the two electric motors EMA, EMB. The example graph of FIG. 5 illustrates engine, motor and output power best suited for the IB-EV mode during the example drive cycle.

The inventors have determined that the most optimum point of operation in the IB-EV mode (at the requested level of output torque) will be the point that minimizes battery power. To determine this point, an operating window within which the torque sources can operate is initially determined at step 406. This will be a function of motor torque limits at their respective speeds, clutch torque limits and battery power limits. Once the window is found, a motor operation control process such as e.g., the one disclosed in U.S. Application No. 61/513,112; filed Jul. 29, 2011; and titled "Motor Operation Control System for an Electrically Variable Transmission," the disclosure incorporated herein by reference, will determine the necessary torques needed to fulfill the output torque request with minimum battery power usage. This required battery power along with various other auxiliary loads such as e.g., power consumption for the clutch actuation mechanism, will be used to determine the cost of operating the hybrid transaxle in the IB-EV mode. The cost will also reflect other things that affect drivability such as whether there is sufficient torque/power available in the system to start the engine.

Steps 408 and 412 calculate the costs for operating the system in the two under drive modes. Step 408 calculates the cost for operating the system in the UD-EV mode, shown as function $f_{EV}(P_{Disch}, P_{Electrical})$, and step 412 calculates the cost for operating the system in the UD-EO mode, shown as function $f_{EO}(P_{Disch}, P_{Engine}, P_{Electrical})$. $P_{Engine}$ is the penalty for operating the engine.

Figure 6:
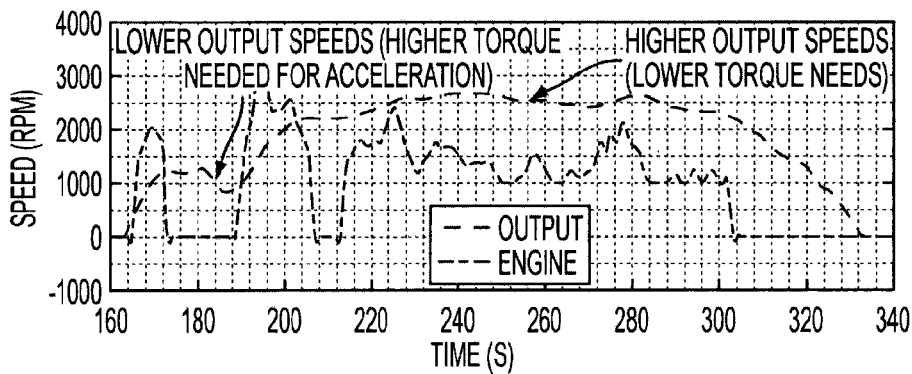
FIG. 6 is a graph of output and engine speeds versus time for under and over drive modes of operation in accordance with the present disclosure.
Figure 7:
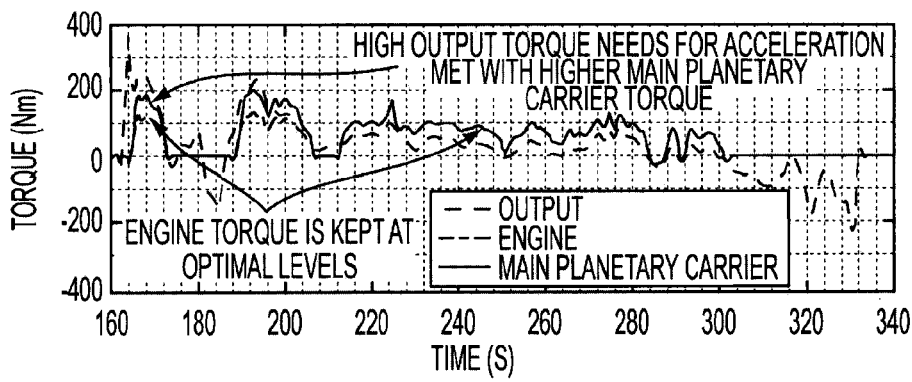
FIG. 7 is a graph of output, engine and main planetary torques versus time for under and over drive modes of operation in accordance with the present disclosure.

As mentioned above, under drive is achieved by engaging the first clutch $CB_1$ while disengaging the second clutch $C_2$. Engaging the first clutch $CB_1$ while keeping the second clutch $C_2$ disengaged/open allows a higher gear ratio between the engine and the main planetary carrier. This significantly increases the mechanical path (i.e., the engine torque contribution to the output torque) of the hybrid transaxle. This mode is desirably used for accelerating the vehicle or when the vehicle is run under load. The example graph of FIG. 6 illustrates output and engine speeds best suited for the under drive modes during the example drive cycle. The example graph of FIG. 7 illustrates output, engine and main planetary torques best suited for the over drive modes during the example drive cycle.

Steps 408 and 412 will find the most optimum point of operation of the hybrid system for the two under drive modes for a given output power demand. The desired battery power $P_{batt_{des}}$ will be determined based on the driver requested output power $P_{oreq}$ and the state of charge of the battery. The desired engine power $P_e$ can be determined as follows:

$$P_e = P_{oreq} + P_{batt_{des}} + P_{Losses_{electrical}} + P_{Losses_{mechanical}} \qquad (1)$$

$P_{Losses_{electrical}}$ are the losses associated with running the electrical path (i.e., the electric motors). $P_{Losses_{mechanical}}$ are the losses associated with running the mechanical path (i.e., the internal combustion engine). $P_{Losses_{electrical}}$ and $P_{Losses_{mechanical}}$ are determined by an optimizer typically found in a hybrid system. The optimizer periodically calculates the most efficient points for operating the hybrid electrical and mechanical systems (at approximately every 100 milliseconds); $P_{Losses_{electrical}}$ and $P_{Losses_{mechanical}}$ are part of the optimizer's calculations.

As with step 406, an operating window within which the torque sources can operate will be determined at steps 408 and 412. These windows will be a function of motor torque limits at their respective speeds, clutch torque limits, engine torque limits and battery power limits. Once the windows of possible operation are found, the steps will determine what engine speed and torque will minimize the cost of operating the system at the above specified power level.

Steps 410 and 414 calculate the costs for operating the system in the two over drive modes. Step 410 calculates the cost for operating the system in the OD-EV mode, shown as function $f_{EV}(P_{Disch}, P_{Electrical})$, and step 414 calculates the cost for operating the system in the OD-EO mode, shown as function $f_{EO}(P_{Disch}, P_{Engine}, P_{Electrical})$. As set forth above, to implement over drive, the second clutch $C_2$ is engaged and the first clutch $CB_1$ is disengaged. Engaging clutch $C_2$ while keeping clutch $CB_1$ open enables a lower gear ratio between the engine and the main planetary carrier. This allows the hybrid transaxle to run at a lower input-to-output ratios, allowing the engine to stay in its optimum operating region for highway and low power demand operating conditions. FIG. 6 also illustrates output and engine speeds best suited for the over drive modes during the example drive cycle. FIG. 7 also illustrates output, engine and main planetary torques best suited for the under drive modes during the example drive cycle.

Steps 410 and 414 will find the most optimum point of operation of the hybrid system for the two over drive modes for a given output power demand. Similar to steps 408 and 412, the desired battery power $P_{batt_{des}}$ will be determined based on the driver requested output power $P_{oreq}$ and the state of charge of the battery. Thus, the desired engine power $P_e$ will be determined using equation (1) shown above.

As with steps 406, 408 and 412, an operating window within which the torque sources can operate will be determined at steps 410 and 414. These windows will be a function of motor torque limits at their respective speeds, clutch torque limits, engine torque limits and battery power limits. Once the windows of possible operation are found, the steps will determine what engine speed and torque will minimize the cost of operating the system at the above specified power level.

At step 416, the process selects the mode with the lowest cost of the five calculated costs from steps 406-414. At this point, pedal position, engine speed and the present mode and certain other drivability constraints are accounted for at step 418 before sending the appropriate mode to the control system (at step 420). The constraints could include shift busyness, constant changes in engine speeds down to optimization sensitivity, undesirable engine speed fluctuations, etc. At step 420 the final determination selecting the appropriate mode is made and sent to the control system.

At this point, the process 400 has placed the drive system in its most optimum operating condition for the current point in the drive cycle. The process efficiently switches between drive modes and gear ratios to optimize the system's and vehicle's driving performance. Smoother shifts between gear ratios will increase the driver's experience. The process 400 will also improve the vehicle's fuel economy by maximizing the use of the electric motors.

Figure 8:
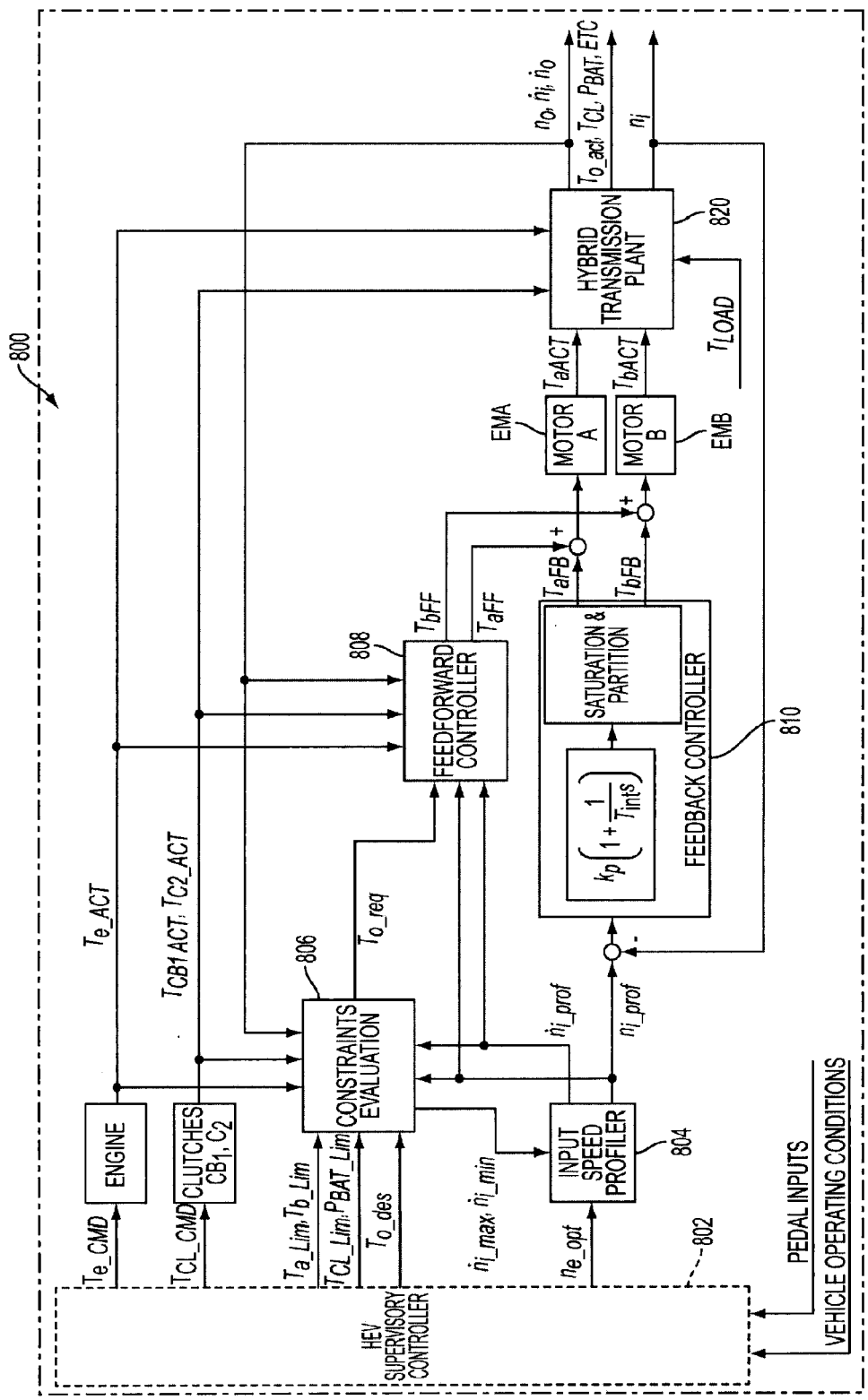
FIG. 8 is a block diagram of a portion of a vehicle's powertrain incorporating a controller for executing the methodology disclosed herein.

FIG. 8 is a block diagram of a portion of a vehicle's powertrain 800 incorporating a supervisory hybrid electric vehicle controller 802 for executing the process 400 disclosed herein. The powertrain 800 also includes an input speed profiler 804, a constraints evaluator 806, a feedforward controller 808, feedback controller 810, the engine, first and second clutches $CB_1$, $C_2$, first and second electric motor controllers 812, 814 for respectively controlling the first and second electric motors EMA, EMB, and a hybrid transmission plant 820. The supervisory hybrid electric vehicle controller 802 executes process 400 and inputs pedal position and the various other vehicle operating conditions and parameters discussed above with reference to process 400. Outputs from the supervisory hybrid electric vehicle controller 802 are used to control the engine, clutches $CB_1$, $C_2$ and the motors EMA, EMB (via the input speed profiler 804, constraints evaluator 806, feedforward controller 808, motor controllers 812, 814, and the feedback controller 810) in accordance with the process 400 described herein. The other operations of the powertrain 800, including the input speed profiler 804, constraints evaluator 806, feedforward controller 808, the feedback controller 810, as well as the various parameters used by these components, are discussed in more detail in U.S. Application No. 61/513,061.

What is claimed is:

1. A method of selecting an operating mode for a vehicle having an electrically variable transmission, the operating mode being one of a plurality of electric vehicle modes and engine-on modes, said method comprising using a processor to perform the steps of:
   determining a battery discharge penalty;
   determining, based at least partially on the battery discharge penalty, a cost associated with operating an electrical portion of the transmission in each of the plurality of electric vehicle modes and engine-on modes;
   determining, based at least partially on the battery discharge penalty, a cost associated with operating a mechanical portion of the transmission in each of the plurality of electric vehicle modes and engine-on modes;
   calculating respective total costs for operating the vehicle in each of the plurality of electric vehicle modes and engine-on modes based on the battery discharge penalty and the determined costs associated with operating the electrical and mechanical portions of the transmission in each of the plurality of electric vehicle modes and engine-on modes;
   selecting the operating mode for the vehicle as the one electric vehicle mode or engine-on mode having the lowest calculated total cost for operating the vehicle;
   after selecting the operating mode, evaluating a drivability impact of changing the operating mode of the vehicle to the selected operating mode; and
   commanding a control system of the vehicle to change the operating mode of the vehicle to the selected operating mode based on the drivability impact.

2. The method of claim 1, further comprising:
   determining an output speed of the vehicle;
   determining a desired output torque of the transmission; and
   determining a state of charge of the battery.

3. The method of claim 2, wherein the determining of the battery discharge penalty is determined based on the output speed, output torque and state of charge of the battery.

4. The method of claim 2, further comprising inputting a speed of the vehicle and a pedal position of the vehicle's throttle, wherein the output speed and desired output torque are determined based on the input speed and pedal position.

5. The method of claim 1, wherein the electrically variable transmission comprises at least one braking clutch.

6. The method of claim 1, wherein the plurality of electric vehicle modes and engine-on modes comprise an input brake electric vehicle mode, an over drive electric vehicle mode, an under drive electric vehicle mode, an over drive engine-on mode, and an under drive engine-on mode.

7. A controller for selecting an operating mode for vehicle having an electrically variable transmission, the operating mode being one of a plurality of electric vehicle modes and engine-on modes, said controller comprising:

a processor programmed to:

determine a battery discharge penalty;

determine, based at least partially on the battery discharge penalty, a cost associated with operating an electrical portion of the transmission in each of the plurality of electric vehicle modes and engine-on modes;

determine, based at least partially on the battery discharge penalty, a cost associated with operating a mechanical portion of the transmission in each of the plurality of electric vehicle modes and engine-on modes;

calculate respective total costs for operating the vehicle in each of the plurality of electric vehicle modes and engine-on modes based on the battery discharge penalty and the determined costs associated with operating the electrical and mechanical portions of the transmission in each of the plurality of electric vehicle modes and engine-on modes;

select the operating mode for the vehicle as the one electric vehicle mode or engine-on mode having the lowest calculated total cost for operating the vehicle;

after the operating mode is selected, evaluate a drivability impact of changing the operating mode of the vehicle to the selected operating mode; and command a control system of the vehicle to change the operating mode of the vehicle to the selected operating mode based on the drivability impact.

8. The controller of claim 7, wherein the processor is further programmed to:

determine an output speed of the vehicle;

determine a desired output torque of the transmission; and determine a state of charge of the battery.

9. The controller of claim 8, wherein the battery discharge penalty is determined based on the output speed, output torque and state of charge of the battery.

10. The controller of claim 8, wherein the processor is further programmed to input a speed of the vehicle and a pedal position of the vehicle's throttle, and wherein the output speed and desired output torque are determined based on the input speed and pedal position.

11. The controller of claim 7, wherein the electrically variable transmission comprises at least one braking clutch.

12. The controller of claim 7, wherein the plurality of electric vehicle modes and engine-on modes comprise an input brake electric vehicle mode, an over drive electric vehicle mode, an under drive electric vehicle mode, an over drive engine-on mode, and an under drive engine-on mode.

13. The method of claim 1, wherein the step of evaluating the drivability impact considers pedal position, engine speed and a current operating mode of the vehicle.

14. The controller of claim 7, wherein the processor is programmed to evaluate the drivability impact based on pedal position, engine speed and a current operating mode of the vehicle.

* * * * *